United States Patent
Stengel

(10) Patent No.: US 6,860,679 B2
(45) Date of Patent: Mar. 1, 2005

(54) ADSORBENT PARTICLES PREPARATION METHOD AND TREATMENT OF SOILS POLLUTED BY HYDROCARBONS USING SAID PARTICLES

(76) Inventor: Patrice Stengel, Chemin du Cagnose, Villa l'Olivette, 06140 Vence (FR)

( * ) Notice: Subject to any disclaimer, the term of this patent is extended or adjusted under 35 U.S.C. 154(b) by 0 days.

(21) Appl. No.: 10/432,555

(22) PCT Filed: Nov. 20, 2001

(86) PCT No.: PCT/FR01/03630

§ 371 (c)(1),
(2), (4) Date: May 22, 2003

(87) PCT Pub. No.: WO02/42017

PCT Pub. Date: May 30, 2002

(65) Prior Publication Data

US 2004/0013470 A1 Jan. 22, 2004

(30) Foreign Application Priority Data

Nov. 23, 2000 (FR) .............................. 00 15116

(51) Int. Cl.$^7$ ............................. B09J 20/22; B09B 3/00
(52) U.S. Cl. ............................. 405/128.1; 405/128.75; 241/2; 502/401
(58) Field of Search ..................... 405/128.1, 128.45, 405/128.7, 128.75; 502/401, 402; 241/2, 92

(56) References Cited

U.S. PATENT DOCUMENTS 3,627,211 A  * 12/1971  Leach ............................ 241/3

FOREIGN PATENT DOCUMENTS

| DE | 1943848 | 3/1971 |
|---|---|---|
| DE | 2903056 | 8/1979 |
| DE | 4007695 A1 | 9/1991 |
| DE | 19707251 A1 | 8/1998 |
| EP | 0860491 A1 | 8/1998 |
| EP | 0878501 A | 11/1998 |
| FR | 2478663 | 9/1981 |
| GB | 1299273 A | 12/1972 |
| WO | WO 90/14159 | 11/1990 |

OTHER PUBLICATIONS

Derwent abstract for EP878501.*

Derwent abstract for EP860491.*

* cited by examiner

Primary Examiner—John Kreck
(74) Attorney, Agent, or Firm—Cohen, Pontani, Lieberman & Pavane

(57) ABSTRACT

The present invention relates to a method of preparing adsorbent particles formed from expanded plastics materials, said particles comprising cellular structures that are open at their surface, characterized in that a material constituted by agglomerated beads of said expanded material and having smooth surfaces is rasped into fine chips. The present invention also relates to adsorbent particles formed from an expanded plastics material comprising cellular structures that are open at their surface, characterized in that they are in the form of fine chips, preferably with a dimension of 0.8 mm to 4 mm, said open cellular structures represent more than 80% of the visible surface area of said chips. In a method of treating soil polluted with hydrocarbons, the following steps are carried out, in which: 1) said polluted soil is mixed with adsorbent particles according to the invention; and 2) said adsorbent particles charged with hydrocarbons are separated from the depolluted soil.

21 Claims, 2 Drawing Sheets

ADSORBENT PARTICLES PREPARATION METHOD AND TREATMENT OF SOILS POLLUTED BY HYDROCARBONS USING SAID PARTICLES

PRIORITY CLAIM

This is a U.S. national stage of application No. PCT/FR01/03630, filed on Nov. 20, 2001. Priority is claimed on that application and on the following application(s): Country: France, Application No.: 00/15116, Filed: Nov. 23, 2000

The present invention relates to adsorbent particles formed from expanded plastics materials, said particles comprising cellular structures that are open at their surface.

FIELD OF THE INVENTION

The present invention also relates to a method of preparing said adsorbent particles.

Finally, the present invention relates to a method of treating soil polluted with hydrocarbons.

More particularly, the present invention relates to a method of cleaning soil polluted with hydrocarbons, by making use of a receiving phase constituted by adsorbent particles formed from an expanded plastics material, in which said polluted soil is brought into contact with said receiving phase, then said receiving phase charged with said aliphatic or aromatic hydrocarbons, is separated.

The term "soil" as used here means any type of soil or sand and other granular material, in particular mineral or vegetable.

BACKGROUND OF THE INVENTION

The present invention concerns removing pollution from hydrocarbons originating from mineral oils such as petroleum, but also from any other animal or vegetable fats and/or chemicals comprising hydrocarbons.

Particles and depollution methods of that type are known from European patent EP-A-0 860 491 and EP-A-0 878 501.

OBJECTS AND SUMMARY OF THE INVENTION

The expanded polymers or copolymers are in the form of agglomerated beads and are constituted on a microscopic level by a matrix of molecular concatenations forming alveoles, cells or micro-cavities with closed volumes and surfaces, the surface being closed and smooth.

Following expansion, expanded plastics materials are in the form of 2 millimeter (mm) to 5 mm beads with smooth surfaces, i.e., the cellular structures of the polymer matrix are closed on the surface. Such particles with smooth surfaces are milled to form adsorbent particles.

EP-A-0 860 491 and EP-A-0 878 501 disclose encouraging the manufacture of adsorbent particles with a large specific surface area by preparing particles of those expanded materials with open cellular structures on their surface, obtained by mechanically milling said material.

Those open cellular structures increase the specific surface area of the particle or the surface/volume ratio and constitute micro-cavities into which the hydrocarbons can be adsorbed.

More precisely, EP-A-0 860 491 teaches the use of particles in the form of 1 mm to 8 mm flakes and specifically constituted by an expanded copolymer of styrene and olefins containing 2 to 4 carbon atoms.

EP-A-0 878 501 describes the use of 5 mm to 20 mm particles for the expanded plastics materials, especially 8 mm diameter beads constituted by polystyrene or an expanded copolymer of styrene and olefins.

In those two documents, the adsorbent particles are obtained by mechanical milling. Various types of milling methods are described.

In EP-A-0 878 501, to obtain 8 mm particles, milling is carried out by chopping pieces necessarily comprising particles constituted by portions of agglomerated beads; more particularly, milling consists of cutting.

In the present invention, the inventor has discovered that surprisingly, the use of chips obtained by rasping substantially increases the adsorbent power compared with chips obtained by mechanical milling.

In one essential aspect, the invention provides an improved depollution method which uses adsorbent particles of expanded materials obtained by rasping, i.e., using an industrial apparatus consisting of a plate in the form of a disk that is completely roughened, which reduces a material into fine chips when the material is mechanically pressed against said plate, which is rotating, the diameter of said chips preferably being 0.8 mm to 4 mm.

After analysis with an electron microscope, the inventor has discovered that by rasping, the surface of the chips exhibits a much greater number of open cellular structures covering almost the entire surface of the particle, while in particles obtained by milling using a prior art technique, only a minor portion of the particle surface exhibits open cellular structures.

Electron microscope analysis shows that rasping optimizes opening of the polymer or copolymer matrix at the surface and increases the formation of preferred adsorption sites, namely micro-cavities or open cellular structures at the surface.

Thus, the present invention provides a method of preparing adsorbent particles formed from expanded plastics materials comprising cellular structures that are open at their surface, characterized in that a material constituted by agglomerated beads of said expanded material is rasped into chips, preferably with a dimension of 0.8 mm to 4 mm, more preferably 2 mm to 3 mm; also preferably, the diameter of said beads is 2 mm to 5 mm.

The term "rasping" as used here means the mechanical operation consisting of mechanically pressing said material against a rotating disk, the disk having perforations surmounted by asperities.

The term "dimension of 0.8 mm to 4 mm" as used here means the largest dimension of the particle.

Advantageously, said chips are obtained by rasping materials originating from expanded packaging waste, preferably cut into strips, in particular into strips that are 2 centimeters (cm) to 10 cm wide.

The present invention also provides adsorbent particles obtained by the process of the invention.

More precisely, the present invention provides adsorbent particles formed from an expanded plastics material comprising cellular structures that are open at their surface, characterized in that they are in the form of chips, preferably with a dimension of 0.8 mm to 4 mm, and said open cellular structures represent more than 75%, preferably more than 80% of the surface area of said chips.

More precisely, the surface area of the openings of the cellular structures exposed on the surface of the chips represents more than 80% of the surface area of the chips when viewed under the electron microscope.

In the present invention, said expanded plastics material is preferably formed from polymers of polystyrene or polyolefins having olefinic monomers containing 1 to 8 carbon atoms, preferably 2 to 4 carbon atoms, or copolymers of styrene with olefinic monomers containing 1 to 8 carbon atoms, preferably 2 to 4 carbon atoms.

More particularly, the particles of the invention are formed from polymers or copolymers selected from polystyrene, polyethylene, polypropylene or copolymers of styrene and ethylene or copolymers of styrene and propylene.

In another original and advantageous feature of the present invention, the adsorbent particles are constituted by a mixture of different polymeric and/or copolymeric particles.

More particularly, 20% to 50% of the adsorbent particles of the invention are constituted by expanded polystyrene polymers, the remainder being constituted by particles of polymers or copolymers selected from polyethylene, polypropylene, copolymers of styrene and ethylene and copolymers of styrene and propylene.

More particularly again, at least 30% of the adsorbent particles of the invention are constituted by particles of polypropylene or copolymers of styrene and propylene.

In a preferred embodiment, the surface of the adsorbent particles of the invention is coated with polyols in the form of a film obtained by nebulizing a solution comprising said polyols such as glycol or glycerol, optionally mixed with a food quality alcohol such as ethanol.

The present invention also provides a method of treating soil polluted with hydrocarbons, characterized in that the following steps are carried out:

1) mixing said polluted soil with adsorbent particles in accordance with the invention;
2) separating said adsorbent particles charged with hydrocarbons from the depolluted soil.

In a particular implementation, a draining step is carried out by centrifuging said adsorbent particles charged with hydrocarbons to extract said hydrocarbons, and said adsorbent particles are recycled as a mixture with said polluted soil.

In a further advantageous and original feature of the method of the invention, the quantity of adsorbent particles used is such that the volume ratio between the volume of said particles and the volume of said hydrocarbons to be extracted is 1 to 1.8.

In accordance with the present invention, the method of the invention can depollute soil polluted with any type of hydrocarbon, either light hydrocarbons such as gasoline or gas oil or heavy hydrocarbons such as heavy fuels, or waxy fuels, or solid residues.

In the presence of a solid hydrocarbon, a prior step for fluidifying said polluted soil is carried out by mixing it with a hydrocarbon having a viscosity that is lower than that of the polluting hydrocarbons contained in said polluted soil, preferably a light gas oil type liquid hydrocarbon.

In a particular implementation, a facility is used comprising the following, from upstream to downstream:

a) a mixer comprising mixing means such as plough share blades in which said polluted soil and said adsorbent particles are mixed; and
b) a decanting tank in which said adsorbent particles charged with hydrocarbons are separated from the depolluted soil, said decanting tank containing water and preferably being provided with mixing means and means for recovering said adsorbent particles floating on the surface and said depolluted soil from the bottom of said decanting tank.

Advantageously, the various steps are carried out at ambient temperature.

Advantageously again, the depolluted soil obtained after separating said receiving phase charged with said hydrocarbons comprises less than 200 parts per millipn (ppm) by weight of hydrocarbons.

Other characteristics and advantages of the invention become apparent from the following detailed description of examples made with reference to the accompanying FIGS. 1 and 2.

MORE DETAILED DESCRIPTION

EXAMPLE 1

Preparation of Adsorbent Particles

Figure 1:
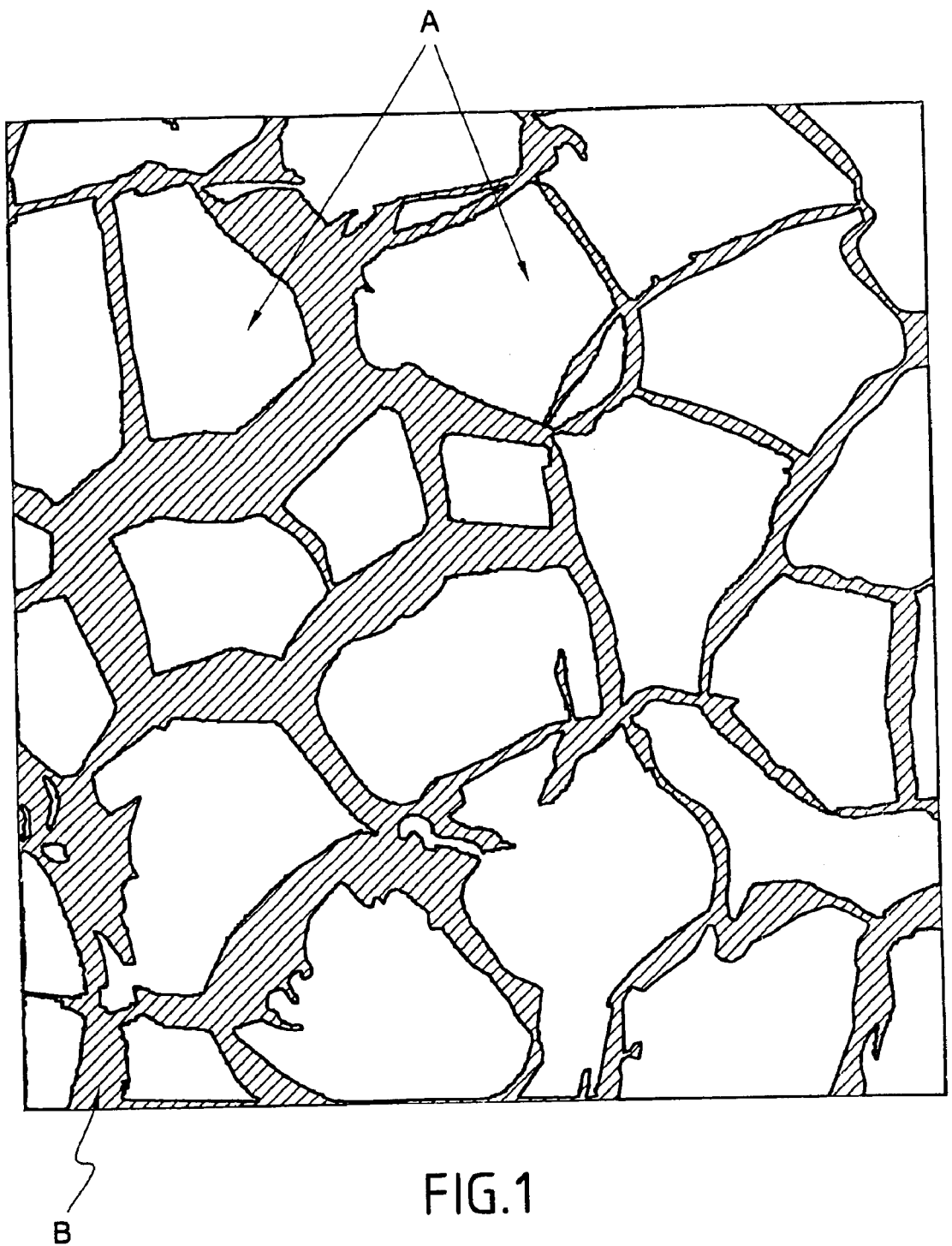
FIG. 1 is a diagram of an electron microscope photograph of the surface of a chip obtained by the rasping described in Example 1.

Particles of expanded polystyrene, expanded polyethylene, and expanded polypropylene were prepared.

Batches of particles constituted by the same plastics material and batches of particles comprising chips constituted by different plastics materials were used; in particular, the following mixture was used:

40% of particles based on expanded polystyrene;
30% of particles based on expanded polyethylene;
30% of particles based on expanded polypropylene.

The particles were obtained from recovered material removed from waste processing plants such as packaging based on expanded packaging waste. The waste was cut into 100 mm wide strips and were then rasped using an apparatus of the type used in commercial kitchens for rasping vegetables, having a horizontal perforated disk with 2.5 mm perforations and roughened all over its surface, which could reduce the waste into fine chips with maximum dimensions of 0.8 mm to 4 mm. Industrial raspers are also available and are known to the skilled person. The size of the perforations in the rasping disk is less than the dimension of the 3 mm beads as they can disaggregate during rasping when mechanically pressed against the rotary disk. This minimum chip size was deduced following various tests that showed the advantage of obtaining chips in this range of dimensions as regards their adsorbent power.

The particles obtained by rasping can be constituted by part of a bead or by a plurality of agglomerated pieces. It should be understood that the shape of the particles is such that they have a shortest dimension (width) that is smaller than the size of the perforations in the disk and that they have a longest dimension (length) that can be slightly greater than the diameter of the perforations in the disk.

The tables below show various results of measuring the adsorbent power produced with particles constituted by different polymers in the milled or rasped form. The milled particles were obtained by milling with a ROTOFLEX® type cutting mill sold by ALPINE (Germany). Here again, sheets of plastics material constituted by agglomerated beads of closed smooth surface were milled.

Batches of milled particles and rasped particles were compared with the same "grain size", i.e., with particle dimensions in the range 0.8 mm to 4 mm in a Gaussian distribution with the majority of particles having a dimension of about 3 mm.

The adsorbent power was measured in accordance with the following experimental protocol.

The measurements were carried out with a synthesized oil of the motor lubricant type.

1.5 grams (g) of polymer particles was brought into the presence of an excess of oil deposited at the bottom of a crystallizer.

The polymer was mixed with the oil using a spatula and then removed to drain it for 10 minutes (min) on a metal screen placed over a crystallizer.

The polymer particles obtained were weighed; P was the weight obtained in grams.

The adsorbent power, measured in grams of oil per gram of polymer particle, was calculated using the formula:

Adsorbent power (g/g)=$P$-1.5/1.5

The results summarized in Table 1 below show that the adsorbent power of the rasped particles was greater than that of the milled particles.

The advantage of the mixture constituted by 40% particles, 30% polyethylene and 30% polypropylene was that it had a high adsorbent power, close to that of polystyrene, while remaining resistant to the dissolving power of certain hydrocarbons such as aromatics, which is not the case with polystyrene.

Polypropylene has a high adsorbent power, but its rarity in waste means that large stocks cannot be built up and so it could not be used alone.

TABLE 1

|  | Adsorbent power milled particles | Adsorbent power rasped particles |
| --- | --- | --- |
| Expanded polystyrene | 14.2 | 17.7 |
| Expanded polyethylene | 8.1 | 9.8 |
| Expanded polypropylene | 17.3 | 24.3 |
| Expanded copolymer of styrene and propylene | 5.6 | 7.0 |
| 40% expanded polystyrene 30% expanded polypropylene 30% expanded polypropylene | 10.5 | 17.1 |

As shown diagrammatically in FIG. 1, analysis by electron microscope shows that rasping optimizes opening of the polymer matrix and the formation of micro-cavities or open cellular structures over almost the entire surface constituting the various faces of said chips. The surface area of the open cellular openings represents more than 80% of the surface of the chips, as can be seen under the electron microscope.

In FIG. 1, the openings in the open alveoles (A) appear black on the microphotograph and are shown in white in the figure, and the solid portions of the polymer matrix (B) appear white on the microphotograph and are shown by hatching in the figure.

Particles obtained by milling, also observed under the electron microscope, showed that said open cellular structures do not represent more than 50% or even less than 30% of the surface area constituting the various faces of the particles. Milling comprises a prior compacting step which crushes the cellular structures; they are only exposed on faces corresponding to sectioned portions, while the other faces are closed smooth surfaces.

The rasping operation thus considerably increases the number of open cellular structures or micro-cavities and thus hydrocarbon attachment sites, thereby increasing the adsorbent power of the particles for hydrocarbons.

EXAMPLE 2

Soil Depollution

The method consists of brining polluted soil or sand into contact with a receiving phase constituted by expanded packaging waste which has undergone a rasping treatment, endowing it with extractive properties as regards hydrocarbons. The mixture is then separated into two phases: the hydrocarbon receiving phase and the phase containing the clean soil or sand. The final step of the method consists in regenerating the receiving phase constituted by recovered material removed from waste processing plants such as packaging based on expanded packaging waste. Thus, this invention also provides a way of recycling these very light bulky materials, which inhibit selective sorting.

To remove the bulkiest waste (wood, scrap iron, rocks . . . ), a soil screening operation is initially carried out, optionally followed by crushing stones to a grain size of 4 mm to 6 mm.

Thus, the first operation consists in screening the soil and placing it in a storage area. A soil preparation operation may prove to be vital: it may consist in fluidification if it is polluted with highly viscous hydrocarbons. Fluidification is performed by adding a liquid hydrocarbon having specifications which satisfy the European Recommendation of March 1999 regarding the reduction of volatile organic compounds (VOCs) and flash point. In the presence of highly clay-like soil, pre-treatment consists of reducing plasticity by adding a suitable improver.

The soil is then introduced into a mill 2 and transported via an endless screw 3 into a plough share mixer 4 having a capacity of 6 cubic meters ($m^3$). Nebulized chips contained in a silo 6 and which have been nebulized in a unit 17 and recycled via a return line 15 can then be added. 4 $m^3$ of polluted soil is mixed with 0.3 $m^3$ of adsorbent particles, which would represent a volume ratio of adsorbent particles/ volume of polluting hydrocarbons of 1.8, the pollutant representing about 4% to 5% by volume of the polluted soil. Mixing is carried out for at least 7 min, preferably 10 min. The mixture used for nebulization comprises a mixture of glycol, glycerol and food quality alcohol such as ethanol. This mixture is pumped into a tank 5.

Figure 2:
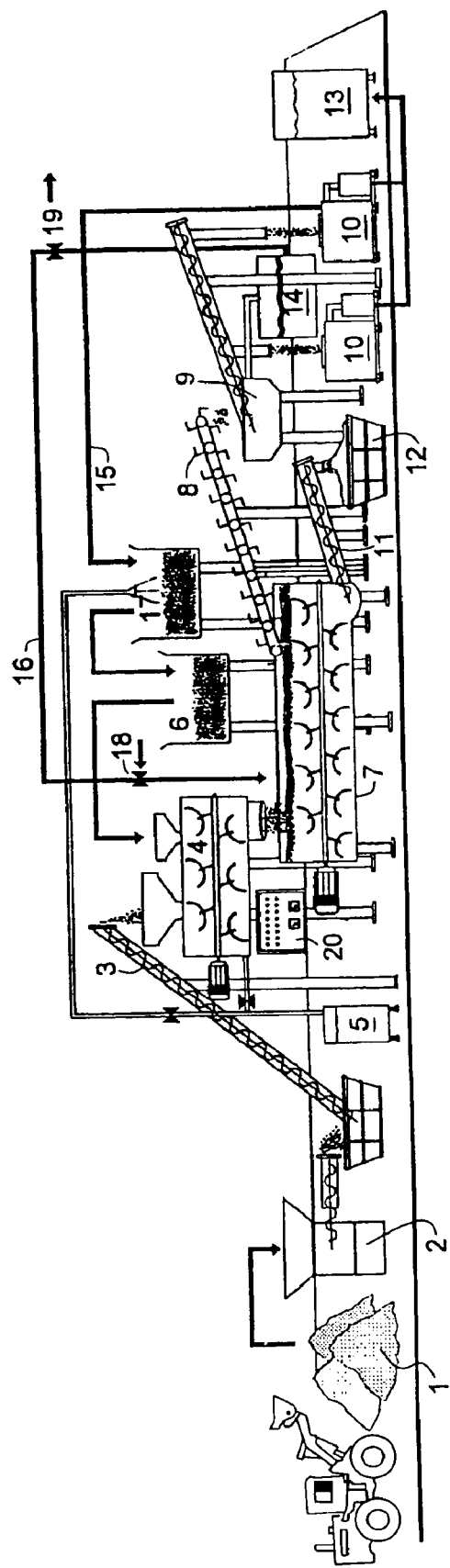
FIG. 2 shows a schematic diagram of a soil depollution facility of Example 2.

Comparative tests have shown that nebulization using supersonic nozzles can produce a mist of very fine particles resulting in better distribution of the coating on the bead, achieving a greater increase in the adsorbent power than with simple spraying. In the facility shown in FIG. 2, the adsorbent particles are activated by nebulizing a film of polyols prior to mixing and introduction into the mixer.

However, a variation of the method consists in nebulizing the chips in the mixer 4 itself. In this case, the polluted soil is also activated by polyols.

The mixture obtained is poured into a separation decanter tank 7 containing a constant level of water and provided with plough share blades to optimize separation of the particles from the soil and to transport the decanted soil to an extraction screw. Here, separation is carried out by density difference: the chips coated with hydrocarbons cannot sink, so they float on the surface, while clean sand settles onto the bottom of the tank 7. A bucket conveyor 8 evacuates the chips floating on the tank surface. A tank 9 receives the chips charged with hydrocarbons; an endless screw distributes them to extractors 10 known as "salad spinners", which centrifuge at at least 900 times the acceleration due to gravity (g). The hydrocarbons are stored in a tank 13 at the outlet from the extractors. The endless screw 11 evacuates the clean sand or soil, which is collected in the receiving tank 12. The water collected in a tank 14 is recycled to the separation tank via a return line 16. In this line, a valve 19 regulates the outflow to the waste water system; the inlet valve 18 compensates for losses due to wet extraction of the sand or soil and the outflow to the waste water system. A fireproof electrical control box 20 can start and stop the various units of the facility.

The great majority of the water from the method is recycled; only a very small amount is sent to the waste water system, in an amount of 80 to 120 liters per (metric) tonne of treated soil. Adjustment can prevent halides from becoming concentrated in the apparatus and can keep the chemical oxygen demand (COD) to a level that is compatible with its discharge. Tests carried out on the polluted soil or sand guarantee that the method can produce clean soil or sand with a hydrocarbon content of less than 200 ppm by weight, while similar methods using adsorbent particles obtained by milling could not produce a hydrocarbon content of less than 1000 ppm. In view of the quality of this result, the soil or sand can be returned directly to their place of origin and do not need to be recycled as inert waste for ballast or for metalling roads.

The receiving phase can be recycled a hundred times and then upgraded by using it in an amount of 15% by weight in bituminous layers. This operation can considerably reduce sound pollution due to traffic (by more than 70% of the initial value).

The invention provides a method of regenerating soil (earth or sand):

which is applicable to any category of hydrocarbon, from the most volatile (gasoline) to the heaviest (heavy fuels, residues) and even waxy hydrocarbons;

which is a cold treatment, which does not cause VOCs to be given off;

which has very low costs when the consumables originate from waste recycling.

What is claimed is:

1. A method of preparing adsorbent particles formed from expanded plastics materials, said particles comprising cellular structures that are open at their surface, said method comprising the step of rasping agglomerated beads of said expanded material into chips having a dimension of 0.8 mm to 4 mm.

2. A method according to claim 1, characterized in that said expanded material originates from packaging waste and is cut into strips.

3. Adsorbent particles obtained by the method according to claim 1 or 2.

4. Adsorbent particles according to claim 3, wherein the particles have an open cellular structures representing more than 75%, of the surface area of said chips.

5. Adsorbent particles according to claim 4, wherein said expanded plastics material is formed from polymers of polystyrene or polyolefins or copolymers of styrene monomers having olefinic monomers containing 1 to 8 carbon atoms.

6. Adsorbent particles according to claim 5 or, characterized in that the particles are formed from polymers or copolymers selected from polystyrene, polyethylene, polypropylene or copolymers of styrene and ethylene or copolymers of styrene and propylene.

7. Adsorbent particles according to claim 5, characterized in that the particles are constituted by a mixture of different polymeric and/or copolymeric particles.

8. Adsorbent particles according to claim 7, characterized in that 20% to 50% of the particles is constituted by expanded polystyrene polymers, the remainder being constituted by particles of polymers or copolymers selected from polyethylene, polypropylene, copolymers of styrene and ethylene and copolymers of styrene and propylene.

9. Adsorbent particles according to claim 8, characterized in that at least 30% of the particles is constituted by polypropylene particles or copolymers of styrene and propylene.

10. Adsorbent particles according to claim 8, characterized in that the particles are coated with polyols in the form of a film applied by nebulizing a mixture comprising said polyols.

11. A method of treating soil polluted with hydrocarbons, characterized in that the following steps are carried out:

1) mixing said polluted soil with a receiving phase constituted by adsorbent particles according to claim 3; and 2) separating said receiving phase charged with hydrocarbons from the depolluted soil.

12. A method according to claim 11, characterized in that an extraction step is carried out by centrifuging said adsorbent particles charged with hydrocarbons to extract said hydrocarbons, and said adsorbent particles are recycled as a mixture with said polluted soil.

13. A method according to claim 11, characterized in that in step 1), a quantity of adsorbent particles is used such that the volume ratio between said particles and said hydrocarbons to be extracted is 1 to 1.8.

14. A method according to claim 11, characterized in that the polluted soil is polluted with any type of hydrocarbon, such as one or more of light hydrocarbons, heavy hydrocarbons and waxy fuels.

15. A method according to claim 12, characterized in that a prior step for fluidifying said polluted soil is carried out by mixing the soil with a hydrocarbon having a viscosity that is lower than that of the polluting hydrocarbons contained in said polluted soil.

16. A method according to claim 13, characterized in that a facility is used comprising the following, from upstream to downstream:

a) a mixer comprising mixing means such as plough share blades in which said polluted soil and said adsorbent particles are mixed; and b) a decanting tank in which said adsorbent particles charged with hydrocarbons are separated from the depolluted soil, said a decanting tank containing water and being provided with mixing means and means for recovering said adsorbent particles floating on the surface and said depolluted soil at the bottom of said decanting tank.

17. A method according to claim 11, characterized in that the various steps are carried out at ambient temperature.

18. A method according to claim 11, characterized in that the depolluted soil obtained after separating said receiving phase charged with said hydrocarbons comprises less than 200 ppm by weight of hydrocarbons.

19. Absorbent particles according to claim 4, wherein said open cellular structures represent more than 80% of the surface area of said chips.

20. Absorbent particles according to claim 6, wherein said expanded plastics material is formed from polymers or copolymers having olefinic monomers containing 2 to 4 carbon atoms.

21. A method according to claim 15, wherein said prior step is carried out by mixing said polluted soil with a light gas oil type liquid hydrocarbon.

* * * * *